United States Patent
Pylate et al.

(10) Patent No.: US 6,312,206 B1
(45) Date of Patent: Nov. 6, 2001

(54) METHOD AND APPARATUS FOR LOADING BULK MATERIALS

(75) Inventors: Don Pylate, Lake Village; Larry Greenich; Bruce Rodgers, both of Pine Bluff, all of AR (US)

(73) Assignee: Planters Cotton Oil Mill, Inc., Pine Bluff, AR (US)

( * ) Notice: Subject to any disclaimer, the term of this patent is extended or adjusted under 35 U.S.C. 154(b) by 0 days.

(21) Appl. No.: 09/511,423

(22) Filed: Feb. 22, 2000

(51) Int. Cl.⁷ ............... B65G 67/02; B30B 9/30
(52) U.S. Cl. ............ 414/345; 100/100; 100/208; 100/209; 100/215; 100/226; 100/229 A
(58) Field of Search ................. 100/100, 208, 100/209, 226, 229 A, 215; 414/345

(56) References Cited

U.S. PATENT DOCUMENTS

| | | |
|---|---|---|
| 430,986 | 6/1890 | Blackman . |
| 856,803 * | 6/1907 | Phillips .............. 100/229 A |
| 1,052,944 | 2/1913 | Osborn . |
| 1,314,437 * | 8/1919 | Silverthorne . |
| 1,694,222 * | 12/1928 | Lehman ............... 100/209 |
| 2,477,250 * | 7/1949 | Hincz ................ 414/343 X |
| 2,712,407 * | 7/1955 | Bell et al. ........... 100/215 X |
| 3,561,624 | 2/1971 | Thurmond . |
| 3,716,081 * | 2/1973 | Landreville ............ 141/12 |
| 3,838,782 | 10/1974 | Gammill, Jr. . |
| 3,842,730 * | 10/1974 | White et al. ......... 100/215 X |
| 3,872,784 | 3/1975 | Kaszuba et al. . |
| 3,877,589 * | 4/1975 | Stockman ............ 100/209 X |
| 3,880,072 * | 4/1975 | Ord ..................... 100/100 |
| 3,886,719 * | 6/1975 | Garrison et al. ........... 56/344 |
| 4,125,196 * | 11/1978 | Liberman et al. ....... 100/229 A X |
| 4,136,610 | 1/1979 | Tyler, Jr. . |
| 4,147,264 * | 4/1979 | Haruey et al. ........ 100/229 A X |
| 4,443,997 * | 4/1984 | Namdari ............. 100/100 X |
| 4,548,131 * | 10/1985 | Williams ............. 100/100 X |
| 4,606,690 | 8/1986 | Svendsen . |
| 4,777,781 * | 10/1988 | Doster ............... 100/100 X |
| 5,577,873 | 11/1996 | Tanaka et al. . |
| 5,899,139 * | 5/1999 | Dorman ................ 100/24 |

FOREIGN PATENT DOCUMENTS

| | | |
|---|---|---|
| 2630718 * | 11/1989 | (FR) ................... 100/226 |

* cited by examiner

*Primary Examiner*—Steven A. Bratlie
(74) *Attorney, Agent, or Firm*—Mark Rogers; Gary N. Speed

(57) ABSTRACT

A method and apparatus for loading bulk materials is disclosed. The apparatus of the present invention comprises a track and a frame movable on the track between a retracted and extended position. A first plate is movably mounted on the frame, and a ram is operably connected to the first plate for moving it between a retracted and extended position. A feeder may also secured to the frame. In operating a press such as the one disclosed, the frame and plate are moved within the container, a compressible material is transferred into the container, the compressible material is compressed, and the frame and plate are moved to a position outside the container. The steps of transferring compressible material into the container and compressing it may be repeated as desired. The frame may also be equipped with a second plate in which case one plate may be compressing material while additional compressible material is simultaneously being transferred into another portion of the container. The container may be a rail car, and the compressible material may be selected from the group consisting of cottonseed, cottonseed hulls, rice hulls, rice mill feed, and soy bean hulls.

18 Claims, 7 Drawing Sheets ure for loading bulk material into a container, and more particularly,
METHOD AND APPARATUS FOR LOADING BULK MATERIALS

BACKGROUND OF THE INVENTION

This invention relates to a method and apparatto such a method and apparatus for compressing bulk material within a rail car.

Bulk materials such as cottonseed, cottonseed hulls, rice hulls, rice mill feed and soybean hulls are sometimes shipped in rail cars. Freight charges for shipping bulk materials via rail cars are typically calculated on a per car basis rather than on the weight of material shipped in the cars. Such bulk materials are sometimes compressed into bales for later transporting and loading onto rail cars. Baling and loading such materials may increase the weight of materials that may be carried in a rail car, but the extra steps and difficulties in baling and loading bales likely outweigh any benefits achieved. In end loaded containers, such as intermodal cargo containers, and in open top style containers, such as gondola style rail cars, equipment such as front-end loaders have sometimes been used to compress bulk material within a container. Such methods slow and disrupt loading and are not practical in rail cars with side doors. As a result, such bulk materials are typically propelled into a rail car using a conveyor belt, auger system, blower system, or some similar bulk material moving equipment and without using any form or method of compressing the material during or after loading.

SUMMARY OF THE INVENTION

It is therefore an object of the present invention to provide a method and apparatus for loading a compressible, bulk material within a container.

It is a further object of the present invention to provide a method and apparatus of the above type that quickly and efficiently compresses bulk materials within a container such as a rail car.

It is a still further object of the present invention to provide a method and apparatus of the above type that allows for simultaneous loading and compressing of bulk materials within a container.

It is a still further object of the present invention to provide a method and apparatus of the above type that allows a press to be situated within a container without interfering with loading of bulk materials.

It is a still further object of the present invention to provide a method and apparatus of the above type that allows a press to be quickly and efficiently moved into and out from containers to be loaded with bulk materials.

It is a still further object of the present invention to provide a method and apparatus of the above type that allows for repeated loading and compressing of bulk material within a container without repositioning or removing of a press.

It is a still further object of the present invention to provide a method and apparatus of the above type that allows for loading and compressing of bulk material within different areas of a container without repositioning or removing of a press.

It is a still further object of the present invention to provide a method and apparatus of the above type that reduces the cost of shipping bulk material.

It is a still further object of the present invention to provide a method and apparatus of the above type that simplifies the loading of bulk materials within a container.

It is a still further object of the present invention to provide a method and apparatus of the above that utilizes a portable press.

Toward the fulfillment of these and other objects and advantages, the apparatus of the present invention comprises a track and a frame movable on the track between a retracted and extended position. A first plate is movably mounted on the frame, and a ram is operably connected to the first plate for moving it between a retracted and extended position. A feeder may also secured to the frame. In operating an apparatus such as the one disclosed, the frame and plate are moved within the container, a compressible material is transferred into the container, the compressible material is compressed, and the frame and plate are moved to a position outside the container. The steps of transferring compressible material into the container and compressing it may be repeated as desired. The frame may also be equipped with a second plate in which case one plate may be compressing material while additional compressible material is simultaneously being transferred into another portion of the container. The container may be a rail car, and the compressible material may be selected from the group consisting of cottonseed, cottonseed hulls, rice hulls, rice mill feed, and soy bean hulls.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein:

FIG. 7 is a schematic view of a portion of the hydraulic system for powering locks of the present invention.

DETAILED DESCRIPTION OF THE PREFERRED EMBODIMENT

Figure 1:
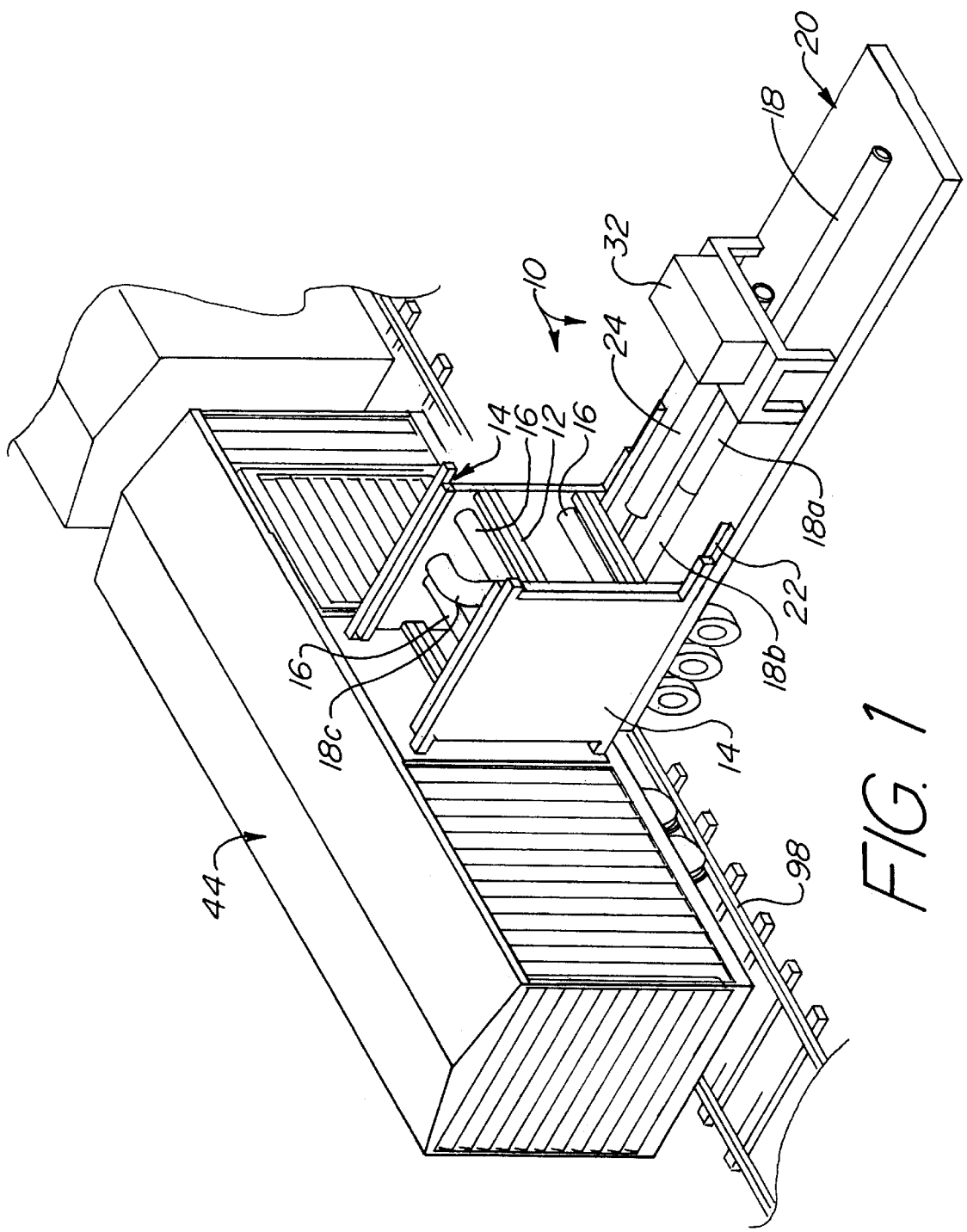
FIG. 1 is an elevation view of a press of the present invention adjacent a rail car, with portions omitted for clarity of presentation.

Referring to FIG. 1, the reference numeral 10 refers in general to a press of the present invention, comprising a frame 12, one or more plates 14 movably secured to the frame 12, and one or more rams 16 operably connected to each plate 14. The press 10 may include a feeder 18, secured to the frame 12, a platform 20, such as a trailer, having one or more tracks 22, and a ram 24 operably connected to the frame 12 and trailer 20 for moving the frame between a retracted and extended position.

Figure 2:
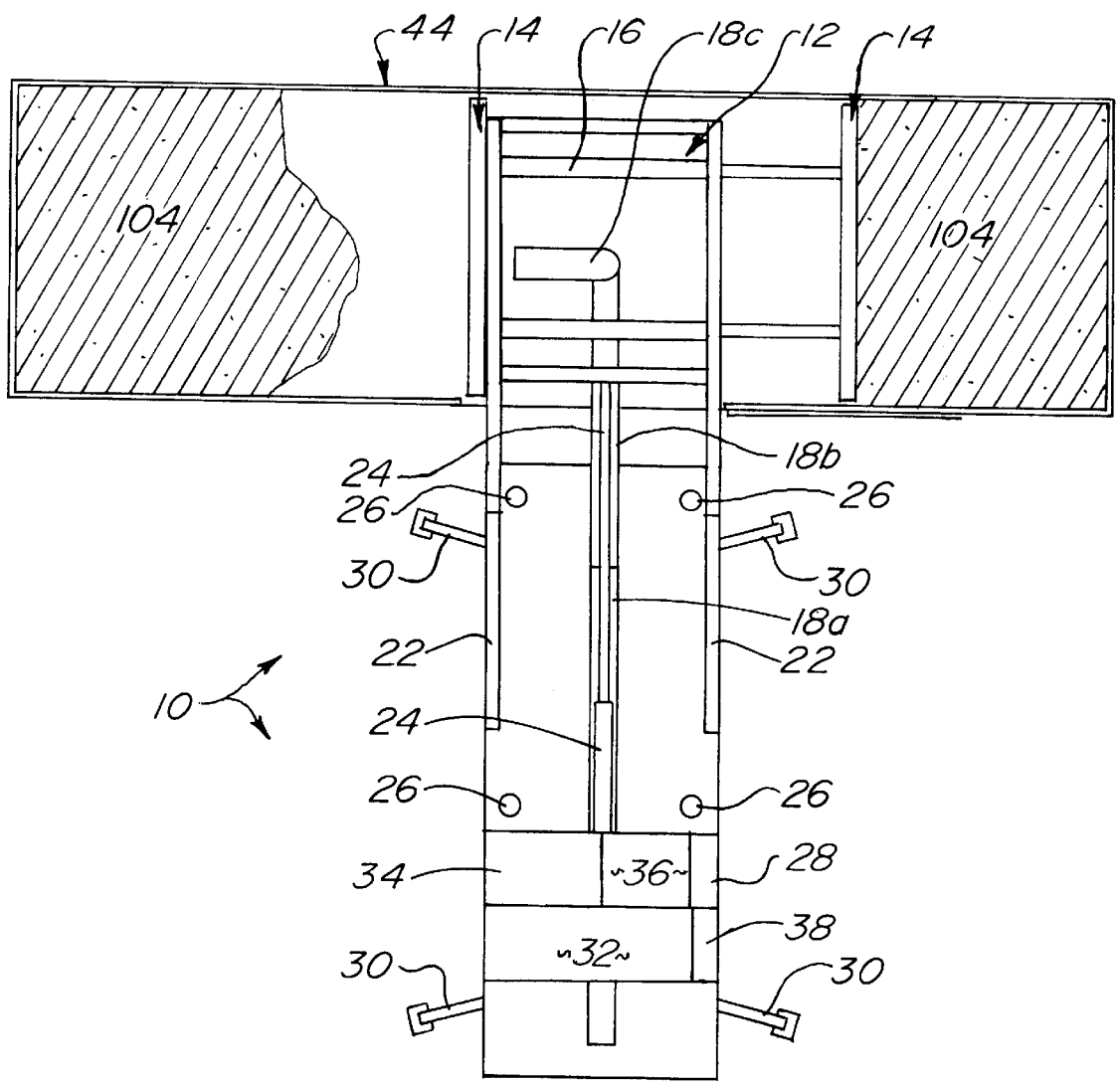
FIG. 2 is a schematic, overhead view of a press of the present invention with a frame in an extended position within a rail car, with portions omitted for clarity of presentation.

The platform 20 is preferably a trailer, such as a flatbed trailer. As best seen in FIG. 2, the trailer 20 is equipped with hydraulic cylinders 26 for raising and leveling the trailer, the cylinders being powered by a separate hydraulic system 28, including a separate hydraulic tank, motor, pump and controls. Chains 30 may be used to secure the trailer 20 to the ground for greater stability. A hydraulic tank 32, pump 34, motor 36, and controls 38 are positioned on the platform 20, with hydraulic lines providing hydraulic fluid to the hydraulic cylinders or rams and other hydraulic components. The tracks 22, formed by angle irons, are secured to a rear portion of the trailer bed, extending substantially parallel with each other on opposite sides of the bed. The feeder 18 is formed by a feed pipe having first, second, and third portions, 18*a,* 18*b,* and 18*c,* respectively. The first portion of the feed pipe 18*a* is secured to the trailer 20, and the first portion is telescopically nested within the second portion 18*b*. A front portion of a hydraulic cylinder or ram 24 is secured to a front portion of the trailer 20, and a rear portion of the ram 24 is secured to the frame 12. The ram 24 is aligned substantially parallel to the tracks 22 and is operably connected to the hydraulic system. Although the frame 12 is preferably mounted on a trailer 20, it is understood that it may be mounted on a fixed platform or no platform at all. Similarly, although the hydraulic tank 32, pump 34, motor 36 and controls 38 are shown positioned on the platform 20 or trailer, it is understood that they could be mounted on the frame 12 or different combinations could be mounted on the frame 12, on the platform 20, or at a location adjacent where the press 10 would be used.

Figure 3:
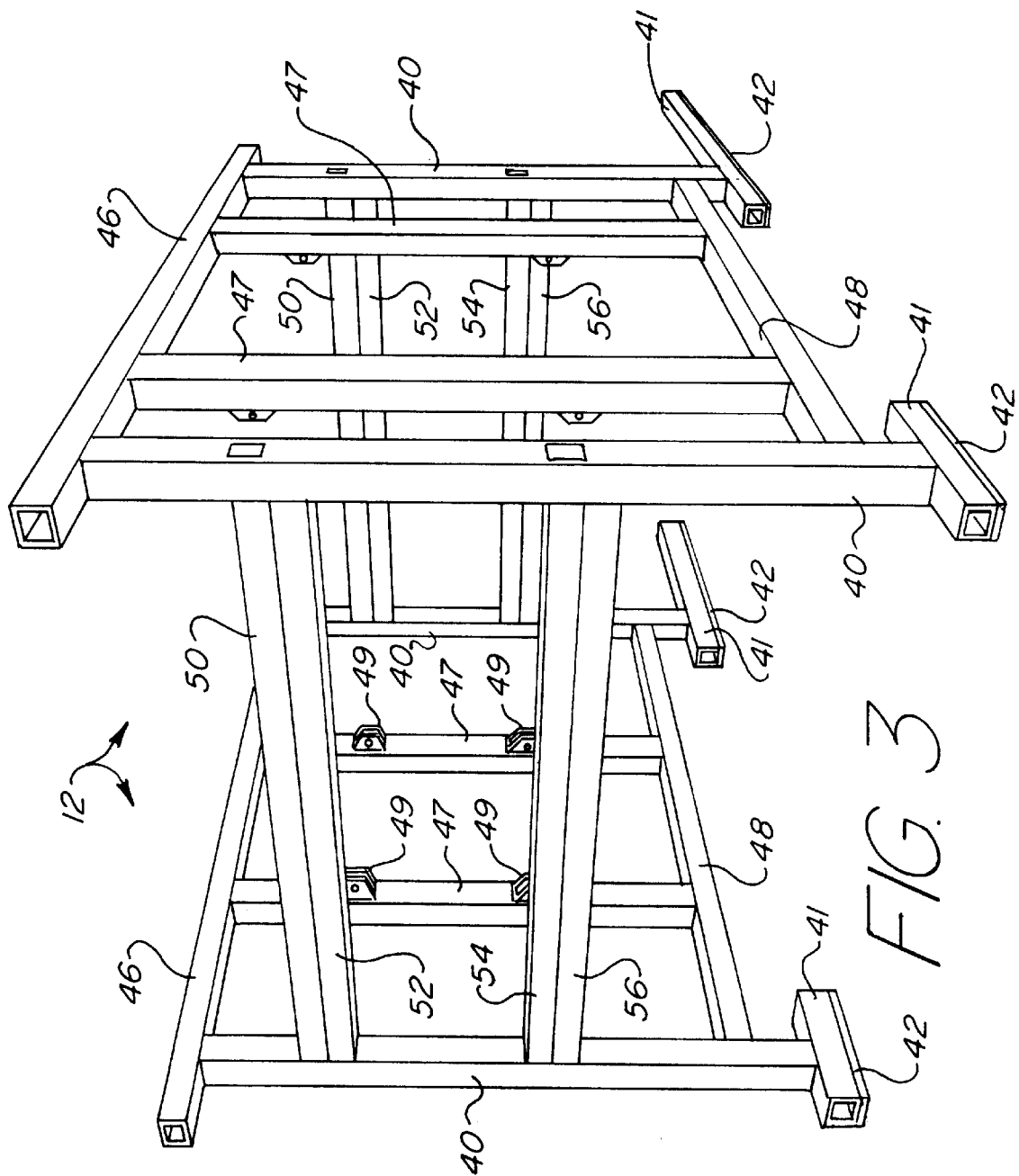
FIG. 3 is an elevation view of a frame of the present invention.

The frame 12 is movably mounted on the tracks 22. As best seen in FIG. 3, the frame 12 is generally box shaped having a front, a rear, and two sides and is preferably formed by steel structural members such as square tubular members. Each side is a mirror image of the other, so only one side is be described in detail. Each side has two vertical members 40. Horizontal members or feet 41 are secured to the bottom of vertical members 40, and bushings 42 formed from UHMW plastic are secured to the bottom of the feet 41 to allow the frame 12 to more easily move along the tracks 22 and along a floor of a rail car 44. The foot 41 on the trailer side of the frame 12 is preferably long enough so that at least a portion of the foot 41 remains on the track 22 when the frame 12 is positioned within the rail car 44. A top member 46 extends between and is secured to the top of the vertical members 40. A bottom member 48 extends between the vertical members 40 at a lower portion of the vertical members. For reasons to be described, the bottom member 48 extends between the vertical members 40 at a point raised from the bottom of the vertical members 40. It is understood that the frame 12 may take any number of shapes, sizes, and configurations and may be formed from any number of known structural members, including but not limited to different combinations of beams, pipes and tubes. It is also understood that bushings may or may not be used, different types of bushings may be used, and any number of combinations of bearings, rollers, and bushings may be used to facilitate movement of the frame 12.

The front of the frame 12 is a mirror image of the back, so only the front is described in detail. A pair of upper members 50, 52 and a pair of lower members 54, 56 extend between corresponding vertical members 40 of the two sides. Bushings formed from UHMW plastic are secured to inner portions of members 50, 54 to facilitate moving the plates 14 between retracted and extended positions. It is understood that any number of front and back frame members may be used, and the members may be aligned in a wide variety of configurations to provide the desired strength, stability, and weight. Also, the front and back members may be formed from any number of known structural members, including but not limited to different combinations of beams, pipes and tubes. It is also understood that bushings may or may not be used, different types of bushings may be used, and any number of combinations of bearings, rollers, and bushings may be used to facilitate movement of the plates relative to the frame 12.

Figure 4:
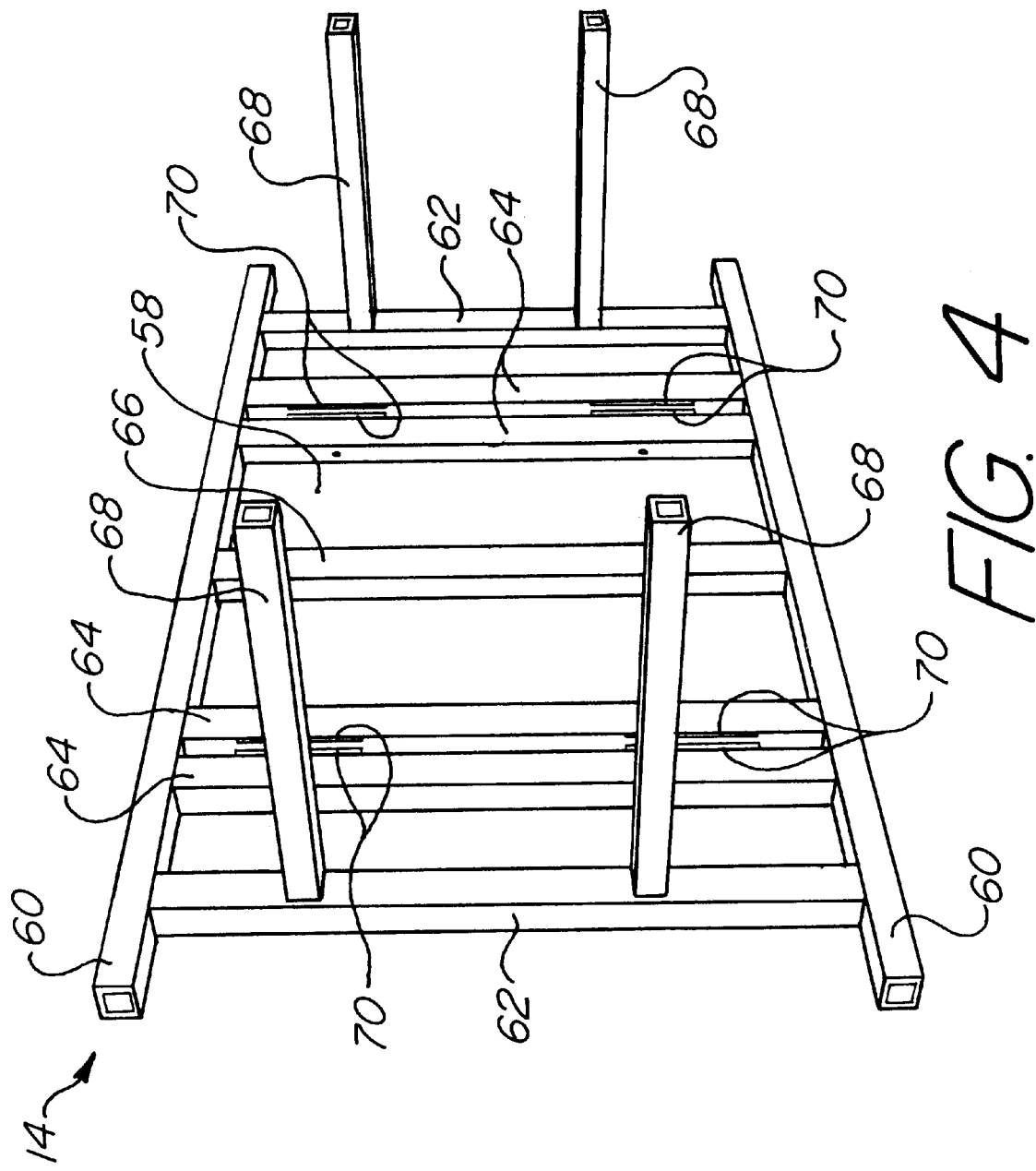
FIG. 4 is an elevation view of a plate of the present invention.

As best seen in FIG. 4, the plate has a planar member 58, horizontally disposed upper and lower members 60, and a plurality of vertically disposed members 62, 64, and 66. Slide members 68 are secured to the outermost vertical members 62, extending substantially horizontally and substantially perpendicular to the planar member 58. The upper slide members 68 are sized to fit within one of the upper frame members 50 and the lower slide members 68 are sized to fit within one of the lower frame members 54. Bushings allow the slide members 68 to glide readily within the upper and lower members 50 and 54. Each slide member 68 is aligned to glide along an axis that is substantially perpendicular to the axes of the tracks 22 and the axis over which the ram 24 moves. Two pairs of vertical members 64 extend between the upper and lower members 60 at intermediate portions thereof. Plates 70 are secured to opposing faces of the members 64, and holes pass through corresponding portions of the members 64 and plates 70 to provide four ready locations for securely connecting the rams 16 to the plates 14. Each ram 16 is aligned to provide movement along an axis that is substantially perpendicular to the axes of the tracks 22 and the axis over which the ram 24 moves. Each plate is a mirror image of the other, so only one plate is be described in detail. It is understood that any number of plates 14 may be used. Also, although the plate is described as being formed by a planar member 58 secured to a number of vertical and horizontal members, it is understood that the plate may take any number of shapes or configurations. For example, the portion that contacts and compresses the compressible material need not be planar and, in fact, need not be a single piece. Further, even though the plate is described as having slide members 68 that fit telescopically within frame members, it is understood that the plates 14 may be attached to the frame 12 in any number of ways. Also the plates 14 may be aligned to move along axes disposed in any number of ways, so that the axes need not be perpendicular to the tracks 22 or ram 24 and need not be parallel with rams 16.

Figure 5:
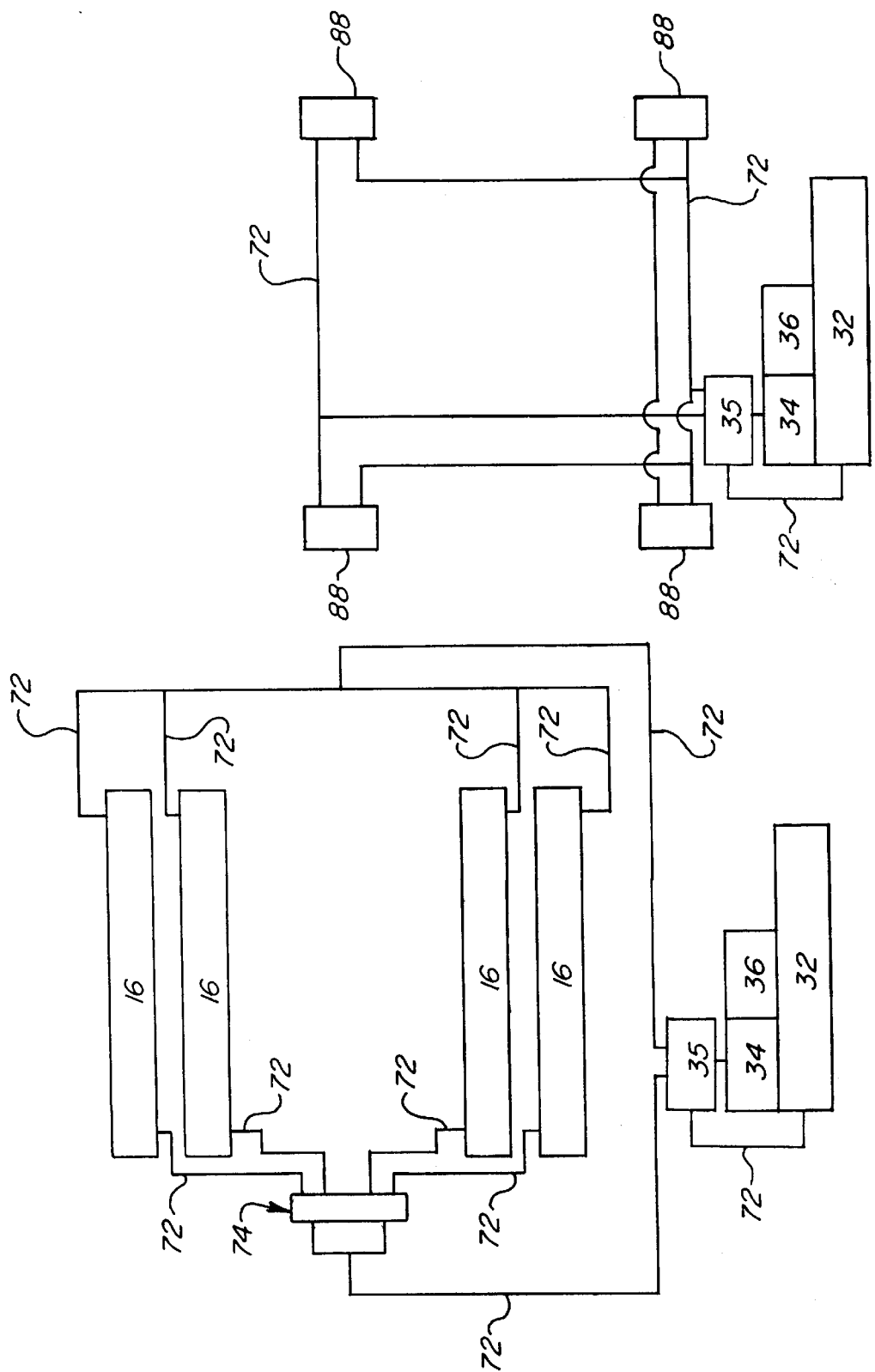
FIG. 5 is a schematic view of a portion of the hydraulic system for powering rams operably connected to the plates.

In one embodiment, four rams or hydraulic cylinders 16 are secured at opposite ends to each plate, with pins passing through corresponding sets of holes for securing the rams to the plates 14. Because each ram 16 is secured to both plates 14 rather than being secured to a plate 14 at one end and to the frame 12 at the other end, fewer rams may be used to move both plates 14. For example, if one wants to use four rams 16 to move a plate, and if one secures each ram to both plates, with an appropriate locking system, a total of only four rams would be needed to move both plates. If, however, one wants to use four rams to move a plate, and if one secures one end of each ram to a plate and the other end of that ram to the frame 12, a total of eight rams would be needed to move both plates. Although any number of rams may be used, for durability and ease of design and use, the configuration using eight rams is preferred. The hydraulic tank 32, pump 34 and motor 36 are secured to the trailer 20. Referring to FIG. 5, hydraulic lines 72 are provided for evenly routing hydraulic fluid to the rams 16. Lines 72 extend from the pump 34 to a flow divider 74 secured to the frame 12, from the flow divider 74 to the rams 16 and from the rams 16 to the pump 34. It is understood that fewer or more rams 16 may be used and that the rams 16 may be secured to the plates or frame in any number of combinations and configurations. Further any number of different types and combinations of equipment may be used for applying force to move the plates between retracted and extended positions.

Figure 6:
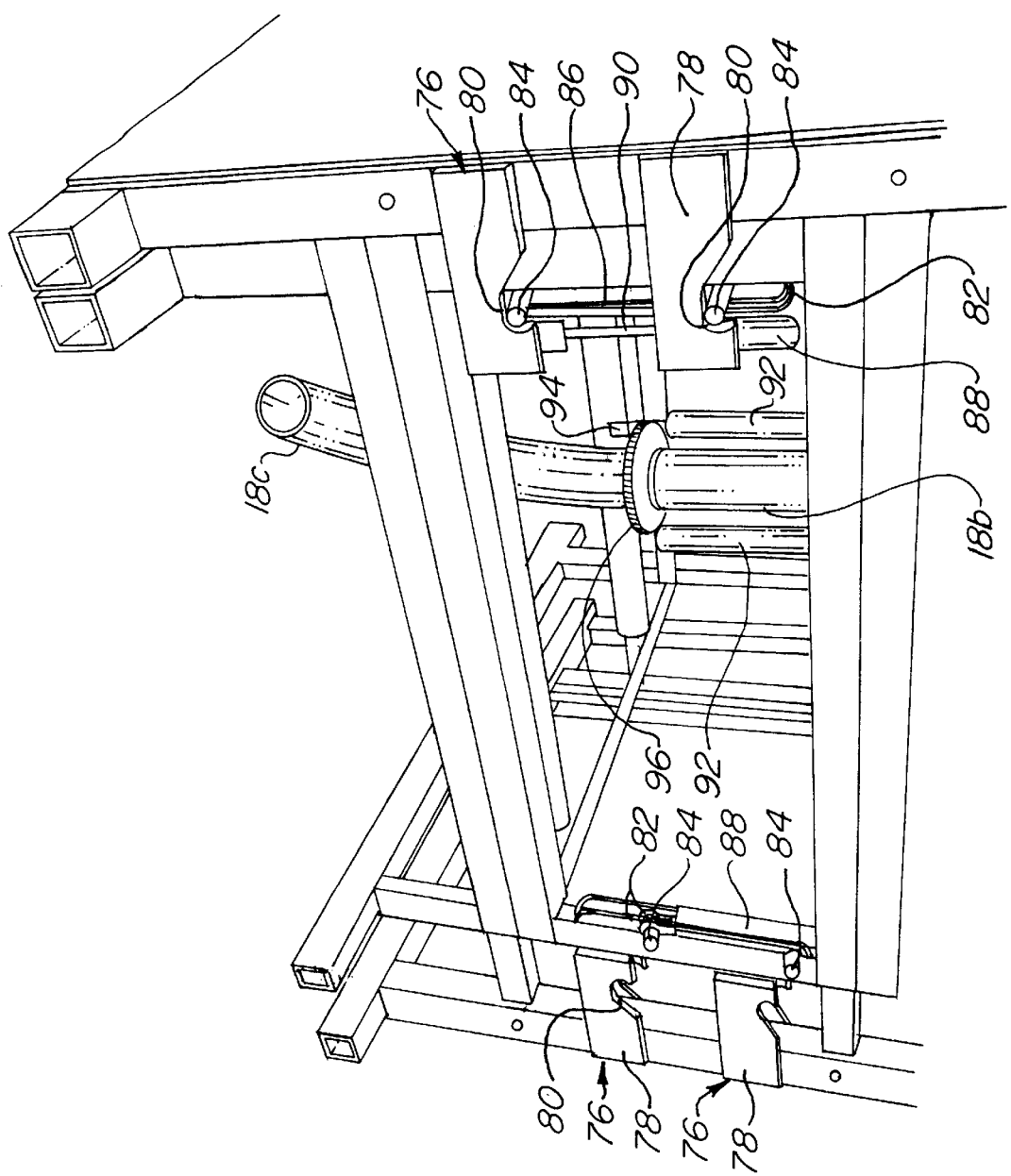
FIG. 6 is a side view of a press of the present invention with a plate partially extended, with portions omitted for clarity of presentation.

As best seen in FIG. 6, locks 76 are provided to secure each plate to the frame 12 as desired. Each lock is substantially identical, so only one lock is described in detail. Upper and lower pairs of metal sheets 78 are secured to an outermost vertical member 62 of a plate, each sheet having a generally hook shaped recess 80 formed in a lower side thereof. A pair of substantially vertical guide members 82 is secured to the vertical member 62 of the frame 12. Two horizontally disposed bars 84, connected by a rigid member 86, are disposed between the vertical guide members 82 and the vertical frame member. A hydraulic cylinder 88 is secured to the frame 12, and a piston 90 of the hydraulic cylinder 88 is secured to one of the bars 84. The bars 84 are aligned with the sheets 78 so that when the piston is in an extended position, the upper bar is received within the recesses 80 of the upper pair of sheets 78 and the lower bar is received within the recesses 80 of the lower pair of sheets 78. Similarly, when the piston is in a retracted position, the upper bar is below the recesses 80 of the upper pair of sheets 78 and the lower bar is below the recesses 80 of the lower pair of sheets 78. Referring to FIG. 7, hydraulic lines 72 are provided for evenly routing hydraulic fluid to the cylinders. Lines 72 extend from the pump 34 to the hydraulic cylinders and back from the hydraulic cylinders to the pump 34. It is understood that fewer or more locks 76 may be used. It is understood that the press 10 may be used with or without locks 76 and that a wide variety of different locking mechanisms may be used if desired. In the preferred embodiment, in which eight cylinders 16 are used, locks are not needed or used since each of the two sets of four cylinders 16 is attached at one end to a plate 14 and at another end to the frame 12.

Referring to FIG. 6, the second and third portions of the feed pipe, 18b and 18c, are secured to the frame. The second portion of the feed pipe 18b is telescopically nested within the third portion of the feed pipe 18c, and the third portion of the feed pipe 18c may be raised, lowered, and rotated relative to the second portion. A pair of hydraulic cylinders 92 is operably connected to the third portion of the feed pipe 18c for raising and lowering the third portion relative to the second portion of the feed pipe 18b and frame 12. The cylinders 92 move the third portion 18c between a lowered and raised position. In the lowered position, the third portion of the feed pipe 18c is low enough to fit through a door of a rail car 44, and in the raised position, the third portion of the feed pipe 18c is high enough to allow it to transfer compressible material over the plates. A hydraulic motor 94 drives a chain or belt 96 that is operably connected to the third portion of the feed pipe 18c for rotating the third portion of the feed pipe relative to the second portion of the feed pipe 18b and frame 12. It is understood that a feeder 18 need not be provided as part of the press 10 and that a wide variety of different feed mechanisms may be used. Further, it is understood that the feeder 18 need not be movable between raised and lowered positions, need not transfer compressible material over the plates, and need not be rotatable.

Figure 8:
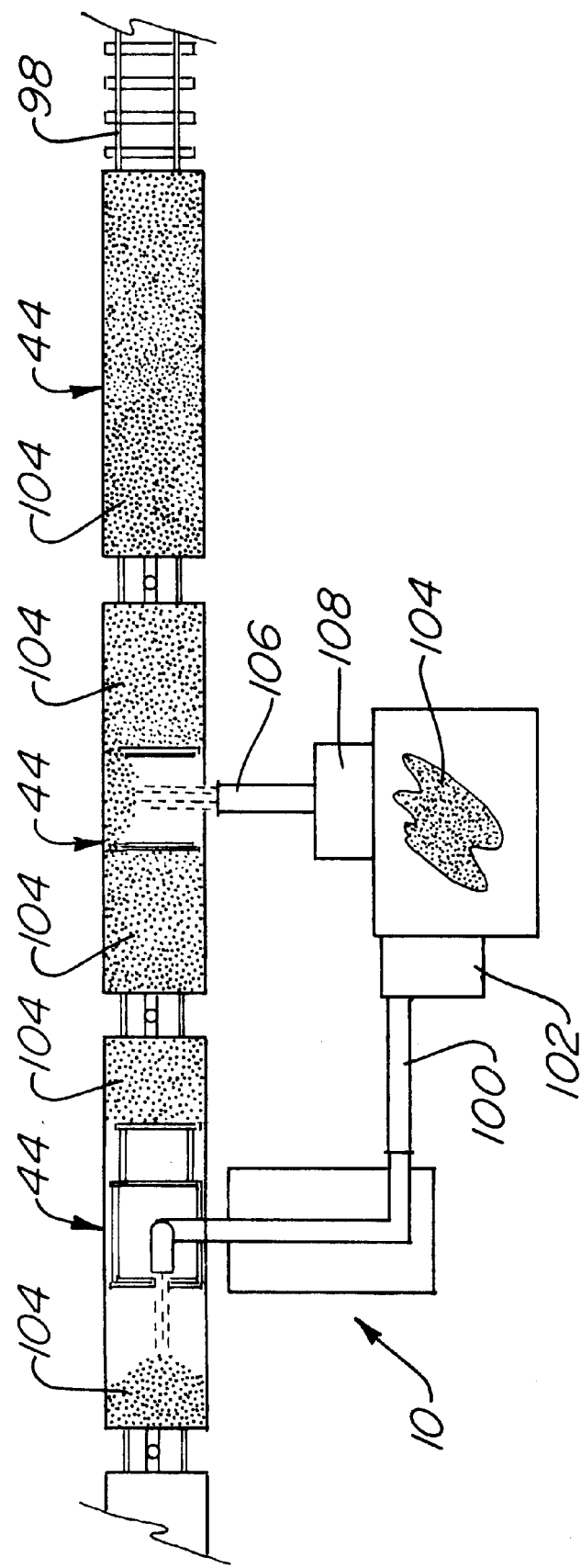
FIG. 8 is a schematic, overhead view of an apparatus and method of loading rail cars according to the present invention.

Referring to FIG. 8, in operation, a press 10 of the present invention is moved to a desired location for loading rail cars.

The trailer 20 is aligned substantially perpendicular to the rail cars 44 and railroad tracks 98. The rear portion of the trailer 20 is positioned near the railroad tracks 98, allowing sufficient clearance for rail cars to move along the railroad track past the press 10. Hydraulic cylinders 26 are used as desired to level the trailer 20 and to raise the trailer, if necessary. The trailer 20 is secured to the ground, such as by using chains 30, to provide added stability. A feed pipe 100 from a blower 102 is secured to the first portion of the feed pipe 18a to provide a source of compressible material 104 such as cottonseed. A second feed pipe 106 and blower 108 are provided for reasons to be described. The trailer 20 is disposed at a distance from the second feed pipe 106 selected to allow the press feeder 18 to transfer compressible material into one rail car 44 while the second feed pipe 106 simultaneously transfers compressible material into an adjacent rail car 44.

An open door of a rail car 44 is aligned with the press 10. With the third portion of the feed pipe 18c in a lowered position and the plates in a retracted position, the ram 24 is actuated to move the frame 12 along the tracks 22 from a first position outside of the rail car 44 to a second position inside the rail car 44. Bushings 42 help the frame 12 glide along the tracks 22 and along the floor of the rail car 44. With the frame 12 in an extended position within the rail car 44, hydraulic cylinders 92 are actuated to move the third portion of the feed pipe 18c from the lowered position to the raised position. If needed, the third portion of the feed pipe 18c is rotated to a position for transferring compressible material into a first portion of the rail car 44.

The blower 102 is activated to transfer compressible material through the feed pipe 100, through the three portions of the feed pipe 18a, 18b, and 18c, and into a first portion of the rail car 44. After a desired amount of compressible material is transferred into the first portion of the rail car, the flow of compressible material is interrupted, and the hydraulic motor 94 is actuated to rotate the third portion of the feed tube to a position for transferring compressible material into a second portion of the rail car 44. The flow of compressible material is then resumed so that a second portion of compressible material is transferred into the second portion of the rail car 44. If locks are used, the locks 76 on the first plate are put in the unlocked position, and the locks 76 on the second plate are put in the locked position. In that regard, if the locks 76 on the first plate are in the locked position, the cylinders 88 are actuated to move the bars 84 from the raised position to the lowered position so that the first plate is not locked against movement relative to the frame 12. Similarly, if the locks 76 on the second plate are in the unlocked position, the cylinders 88 are actuated to move the bars 84 from the lowered position to the raised position so that the second plate is locked against movement relative to the frame.

The rams 16 are actuated to move the first plate from the retracted position to the extended position to compress the compressible material in the first portion of the rail car 44. This step of compressing the material in the first portion of the rail car 44 is preferably performed while the compressible material is being transferred into the second portion of the rail car. The flow divider 74 is used in an effort to have each ram 16 extending and retracting at the same rate as the other rams 16 so that the plate is maintained in a substantially vertical position as it moves from the retracted position to the extended position, and vice versa. The rams 16 may however be extended and retracted at different rates for different positioning and movement of the plate. For example, the upper rams 16 may extend at a slightly faster rate than the lower rams 16, so that the plate is slanted at an angle of approximately 15 degrees from vertical as it moves from the retracted position to the extended position.

After the compressible material in the first portion of the rail car 44 is compressed to a desired amount, the first plate 14 is moved from the extended position to the retracted position. Because the bottom members 48 of the frame sides are raised from the bottom, any compressible material that may have fallen between the plate 14 and frame 12 will not be wedged between the plate 14 and frame 12 and will therefore not prevent the plate from returning to a fully retracted position. After moving the first plate 14 to the retracted position, the locks 76 of the first plate 14 are then moved to the locked position, and the locks 76 of the second plate 14 are moved to the unlocked position.

After a desired amount of compressible material is transferred into the second portion of the rail car 44, the flow of compressible material is interrupted, and the motor 94 is actuated to rotate the third portion of the feed pipe 18c back to a position for again transferring compressible material into the first portion of the rail car 44. The flow of compressible material is then resumed so that a third portion of compressible material is transferred into the first portion of the rail car 44. The rams 16 are actuated to move the second plate 14 from the retracted position to the extended position to compress the compressible material in the second portion of the rail car 44. This step of compressing the second portion of compressible material in the second portion of the rail car 44 is preferably performed while a third portion of compressible material is being transferred into the first portion of the rail car 44. After the second portion of compressible material in the second portion of the rail car 44 is compressed to a desired amount, the second plate 14 is moved from the extended position to the retracted position. The steps of loading material in one portion of the rail car 44 and compressing material in another portion of the rail car 44 may be repeated until a desired amount of material has been transferred into the rail car 44 and compressed. The amount loaded and compressed is selected based upon the size, strength, and load rating of the rail car 44. Care is taken to avoid exceeding the structural limitations of the rail car 44 and to avoid damaging the rail car.

After a desired amount of material has been transferred into the rail car 44 and compressed, the plates 14 are moved to the retracted position, the third portion of the feed pipe 18c is moved to the lowered position, and the ram 24 is actuated to move the frame 12 from an extended position inside the rail car 44 to a retracted position outside of the rail car 44. The locks 76 may or may not be placed in the locked position. The rail car 44 is then moved along the railroad track 98 to a second station aligned with the second feed pipe 106. Additional compressible material 104 is transferred into the rail car 44 to fill the central portion that was occupied by the frame 12 during the first stages of loading. In the preferred embodiment, the press 10 is preferably being used to load and compress material within a second rail car 44 at the same time that the second feed pipe 106 is being used to transfer compressible material 104 into the central portion of the first rail car 44.

Other modifications, changes and substitutions are intended in the foregoing, and in some instances, some features of the invention will be employed without a corresponding use of other features. For example, although the press 10 has been described as having a large number of hydraulic components, hydraulic components need not be used or may be used in different combinations with other known pieces of equipment. Also the press 10 of the present invention offers great flexibility in loading methods. For example, the second feed pipe 106 need not be used. Further, compressible material 104 may be transferred into the rail car 44 before the frame 12 is moved into the rail car. Similarly, the frame 12 may be moved into and out of the rail car 44 any number of time during loading. Also, both plates may be moved at the same time to compress material 104 in different portions of the rail car 44 simultaneously. Further, although the press 10 has been described for use in connection with a rail car 44 having side doors, the press 10 may be used in connection with any number of different rail cars and containers including, but not limited to, rail cars and containers having one or more end doors and rail cars and containers having open tops. Accordingly, it is appropriate that the appended claims be construed broadly and in a manner consistent with the scope of the invention.

What is claimed is:

1. A method of loading rail cars, comprising:
   (a) moving a press from a first position outside of a first rail car to a second position wherein at least a portion of said press is within said first rail car;
   (b) after step (a), transferring a compressible material into said first rail car;
   (c) compressing said compressible material within said first rail car;
   (d) moving said press from said second position to said first position outside of said first rail car;
   (e) aligning a second rail car with said press;
   (f) moving said press from said first position to a third position wherein at least a portion of said press is within said second rail car;
   (g) after step (f), transferring a compressible material into said second rail car;
   (h) compressing said compressible material within said second rail car; and
   (i) moving said press from said third position to a fourth position outside of said second rail car.

2. The method of claim 1, further comprising:
   after step (c) and before step (d), conveying a second amount of compressible material into said first rail car.

3. The method of claim 1, further comprising:
   after step (c) and before step (d), conveying a second amount of compressible material into said first rail car; and
   compressing said second amount within said first rail car.

4. The method of claim 1, further comprising:
   before step (b), selecting said compressible material from the group consisting of cottonseed, cottonseed hulls, rice hulls, rice mill feed, and soy bean hulls.

5. The method of claim 1, wherein:
   step (a) comprises sliding said press along a track from said first position outside of said first rail car to said second position within said first rail car.

6. A method of loading containers, comprising:
   (a) moving a press having a first plate and a second plate from a first position outside of a first container to a second position in which at least a portion of said press is inside said first container;
   (b) transferring a first amount of compressible material into a first portion of said first container;
   (c) moving said first plate from a retracted position to an extended position to compress said first amount of said compressible material;
   (d) returning said first plate from said extended position to said retracted position;

(e) transferring a second amount of said compressible material into a second portion of said first container;

(f) moving said second plate from a retracted position to an extended position to compress said second amount of said compressible material;

(g) returning said second plate from said extended position to said retracted position; and (h) moving said press from said second position to said first position after compressing said first and second amounts of said compressible material;

(i) aligning a second container with said press;

(j) moving said press from said first position to a third position in which at least a portion of said press is inside said second container;

(k) transferring a third amount of compressible material into a first portion of said second container;

(l) moving said first plate from said retracted position to said extended position to compress said third amount of said compressible material;

(m) returning said first plate from said extended position to said retracted position;

(n) transferring a fourth amount of said compressible material into a second portion of said second container;

(o) moving said second plate from said retracted position to said extended position to compress said fourth amount of said compressible material;

(p) returning said second plate from said extended position to said retracted position; and (q) moving said press from said third position to a fourth position outside of said second container after compressing said third and fourth amounts of said compressible material.

7. The method of claim 6, wherein step (a) comprises moving said press having said first plate and said second plate along a first axis from said first position outside of said first container to said second position in which at least a portion of said press is inside said first container; and step (c) comprises moving said first plate from said retracted position to said extended position along a second axis to compress said first amount of said compressible material, said first axis being substantially perpendicular to said second axis.

8. The method of claim 7, wherein:

step (f) comprises moving said second plate from said retracted position to said extended position along a third axis to compress said second amount of said compressible material, said first axis being substantially perpendicular to said third axis.

9. The method of claim 6, wherein said first container is a rail car, and further comprising:

before step (a), aligning a door of said rail car with said press.

10. The method of claim 6, further comprising:

before step (b), selecting said compressible material from the group consisting of cottonseed, cottonseed hulls, rice hulls, rice mill feed, and soy bean hulls.

11. The method of claim 6, further comprising:

after step (d), conveying a fifth amount of said compressible material into said first portion of said first container.

12. The method of claim 11, further comprising:

moving said first plate from said retracted position to said extended position to compress said fifth amount of said compressible material; and returning said first plate from said extended position to said retracted position.

13. The method of claim 6, further comprising:

after step (g), conveying a sixth amount of said compressible material into said second portion of said first container.

14. The method of claim 13, further comprising:

moving said second plate from said retracted position to said extended position to compress said sixth amount of said compressible material; and returning said second plate from said extended position to said retracted position.

15. An apparatus, comprising:

a track;

a frame movable on said track between a first retracted position and a second extended position;

a first plate movably mounted on said frame;

a second plate movably mounted on said frame;

a ram operably connected to said first plate for moving said first plate between a first retracted position and a second extended position; and a feeder secured to said frame, said feeder being operably connected to a source of compressible material to permit said compressible material to flow through said feeder when said frame is in said second extended position, and said feeder comprising first and second pipes, said second pipe being secured to said frame, and said first pipe being telescopically nested with said second pipe.

16. The apparatus of claim 15, wherein said ram is operably connected to said second plate.

17. The apparatus of claim 16, wherein said first plate is movable along a first axis, said first axis being substantially perpendicular to said track.

18. The apparatus of claim 15, further comprising a trailer, said track being secured to said trailer.

* * * * *